Figure 1:
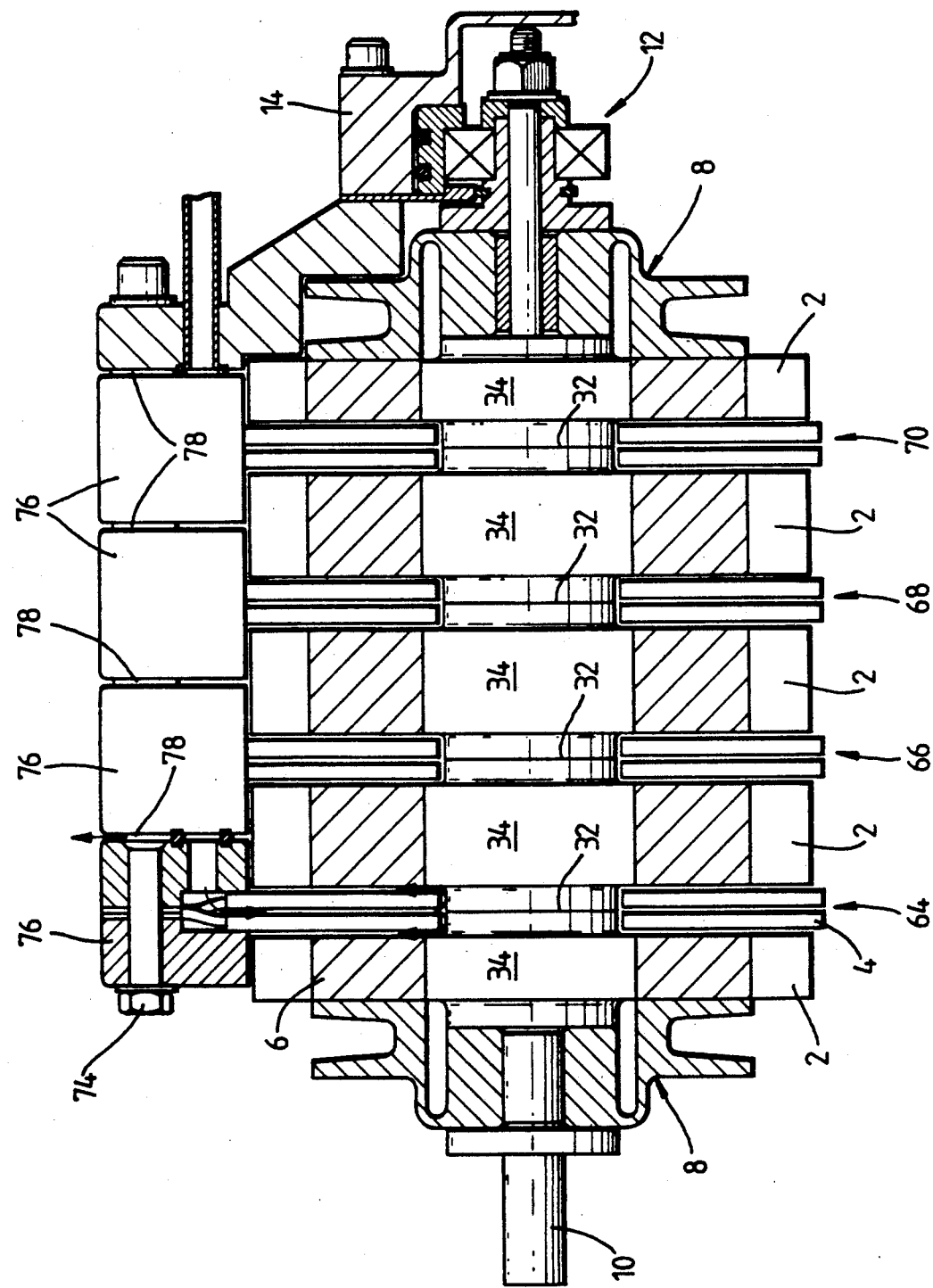

United States Patent [19]

Pullen et al.

[11] Patent Number: 5,021,698
[45] Date of Patent: Jun. 4, 1991

[54] AXIAL FIELD ELECTRICAL GENERATOR

[75] Inventors: Keith R. Pullen, London; Kevin J. Horton, Ansley; Mohammad R. Etemad, London; Arnoldo Fenocchi, London; Laurence W. Eggleston, London; Hugh R. Bolton, Epsom, all of England

[73] Assignee: Rolls Royce plc, London, England

[21] Appl. No.: 581,085

[22] Filed: Sep. 12, 1990

Related U.S. Application Data

[63] Continuation of Ser. No. 385,053, Jul. 26, 1989, abandoned.

[30] Foreign Application Priority Data

Jul. 26, 1988 [GB] United Kingdom ............... 8817760

[51] Int. Cl.⁵ ............................................. H02K 21/24
[52] U.S. Cl. .................................... 310/156; 310/268; 310/112
[58] Field of Search ................. 310/112, 126, 156, 268

[56] References Cited

U.S. PATENT DOCUMENTS

| | | | |
|---|---|---|---|
| 3,818,586 | 6/1974 | Harkness et al. | 29/598 |
| 4,091,301 | 5/1978 | Blank | 310/270 |
| 4,629,920 | 12/1986 | Hermann | 310/156 |
| 4,742,259 | 5/1988 | Schaefer et al. | 310/156 |
| 4,864,175 | 9/1989 | Rossi | 310/156 |
| 4,866,321 | 9/1989 | Blanchard et al. | 310/156 |

FOREIGN PATENT DOCUMENTS

| | | |
|---|---|---|
| 53-124708 | 10/1978 | Japan . |
| 61-170265 | 7/1987 | Japan . |
| 1165786 | 10/1969 | United Kingdom . |
| 26584 | 4/1981 | United Kingdom . |
| 2174252 | 10/1986 | United Kingdom . |

*Primary Examiner*—Steven L. Stephan
*Assistant Examiner*—Judson H. Jones
*Attorney, Agent, or Firm*—Oliff & Berridge

[57] ABSTRACT

Potentially very high power ratings can be achieved from rotary electrical generators in which permanent magnet rotor stages using modern high intensity magnetic materials, for example cobalt samarium or neodymium boron iron. The machine described comprises a plurality of axial field rotor stages each comprising a plurality of magnet segments arranged around a driven hub in a pre-stressed assembly in which encompassing hoop means exerts sufficient compressive stress on the magnets and hub assembly to counter centripetal forces generated by speeds of up to 100,000 rpm. Alternative methods of stressing the hoop means is described.

19 Claims, 5 Drawing Sheets

Fig.2 (a)
Fig.2 (b)
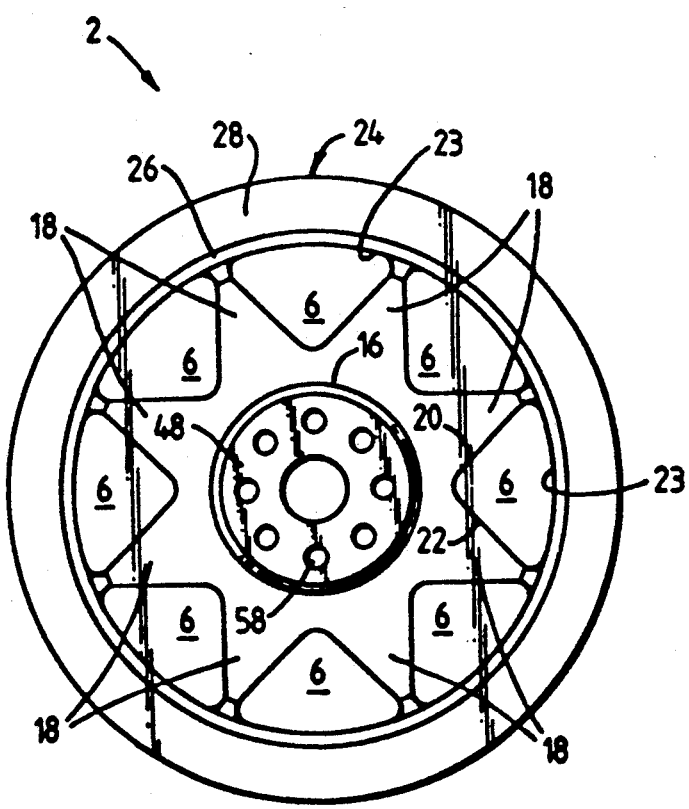
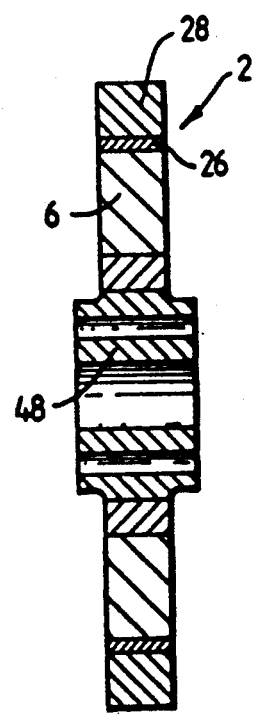

AXIAL FIELD ELECTRICAL GENERATOR

This is a continuation of application Ser. No. 07/385,053 filed July 26, 1989 abandoned.

The invention relates to axial field electrical generator.

An object of the invention is to provide a compact electrical generator and, in particular, a high speed alternator which can be coupled directly to the shaft of a gas turbine engine and spin at very high spaced. New magnetic materials, for example, cobalt samarium and neodymium boron iron are capable of producing the intense magnetic fields necessary for the generation of substantial levels of electrical power from relatively small generators. Generators of this type can be used as primary or auxiliary power systems where compact size and low weight are essential considerations. For instance, they can be used in aircraft as ground run auxiliary power units or they may be useful as standby power generators.

In its broadest form the invention provides an axial field electrical generator having a disc rotor capable of spinning at very high speed which has a plurality of permanent magnets disposed around its circumference and a stator winding spaced axially from a face of the rotor by a very small air gap.

According to one aspect of the invention an axial field electrical generator capable of operating at very high rotational speeds comprises at least one permanent magnet disc rotor having a plurality of permanent magnet segments equi-angularly spaced apart around a hub with which the magnets are engaged and with which engagement is maintained during operation by means of prestressed hoop means encompassing the hub and magnets, and a stator winding spaced a short axial distance from a face of the or each disc rotor.

Preferably the hub is formed with a plurality of radiating means in the from of a series of notches or pockets which receive the permanent magnets and which in the preferred embodiment conform to the shape of the permanent magnets.

The hoop means encompassing the hub and magnet assembly may comprise a composite assembly consisting of, for example, an inner aluminium ring and an outer ring of woven carbon fibre material. The hoop means is pre-stressed sufficiently to resist the normal maximum centrifugal forces experienced by the rotor components. The rings may be stressed initially during assembly by forcedly fitting a slightly oversize boss into a centre bore in the hub or by differentially expanding the hub and the hoop means sufficiently to provide a substantially push fit.

Figure 3:
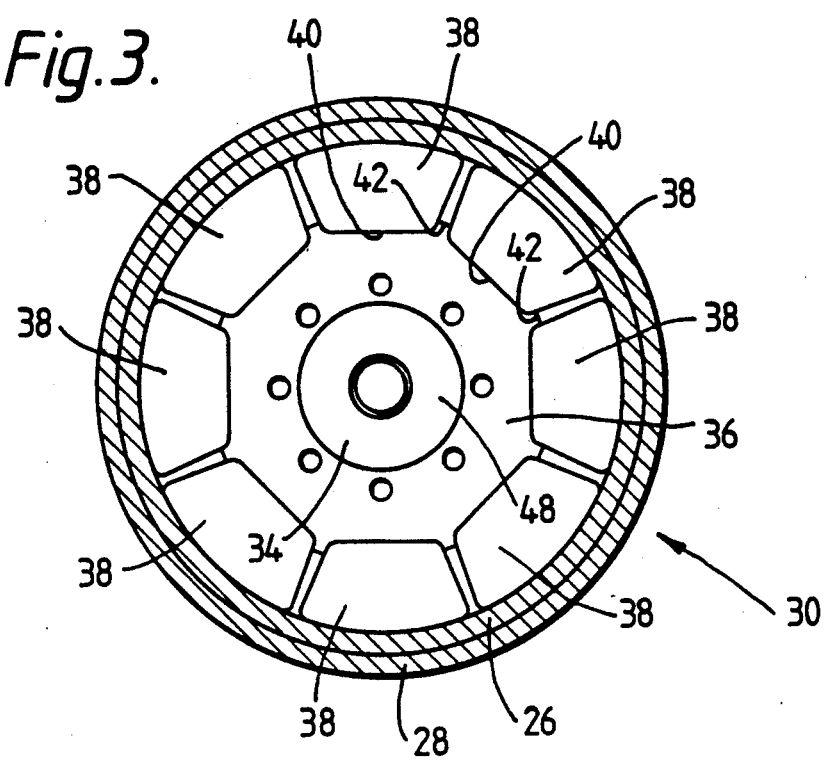
Figure 4:
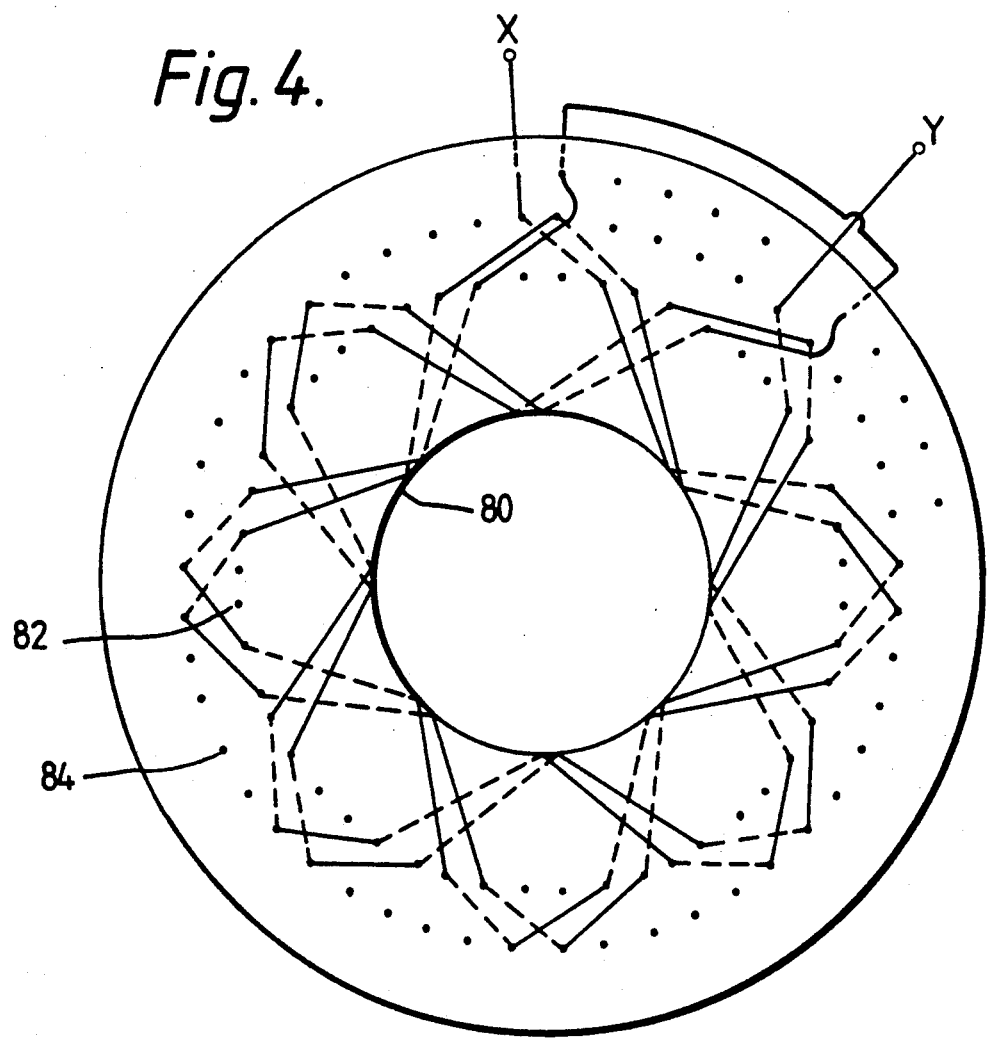
Figure 5:
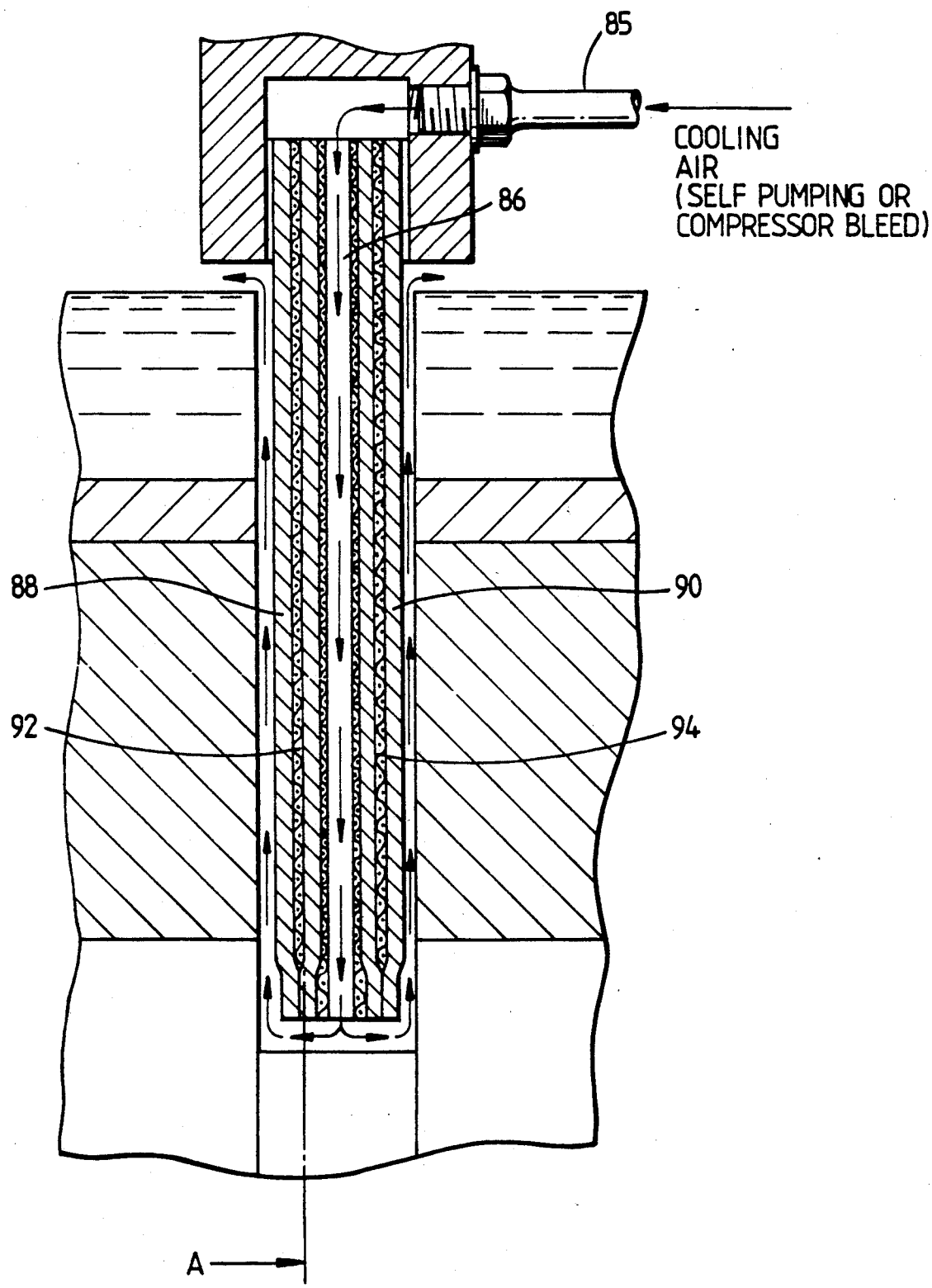
Figure 6:
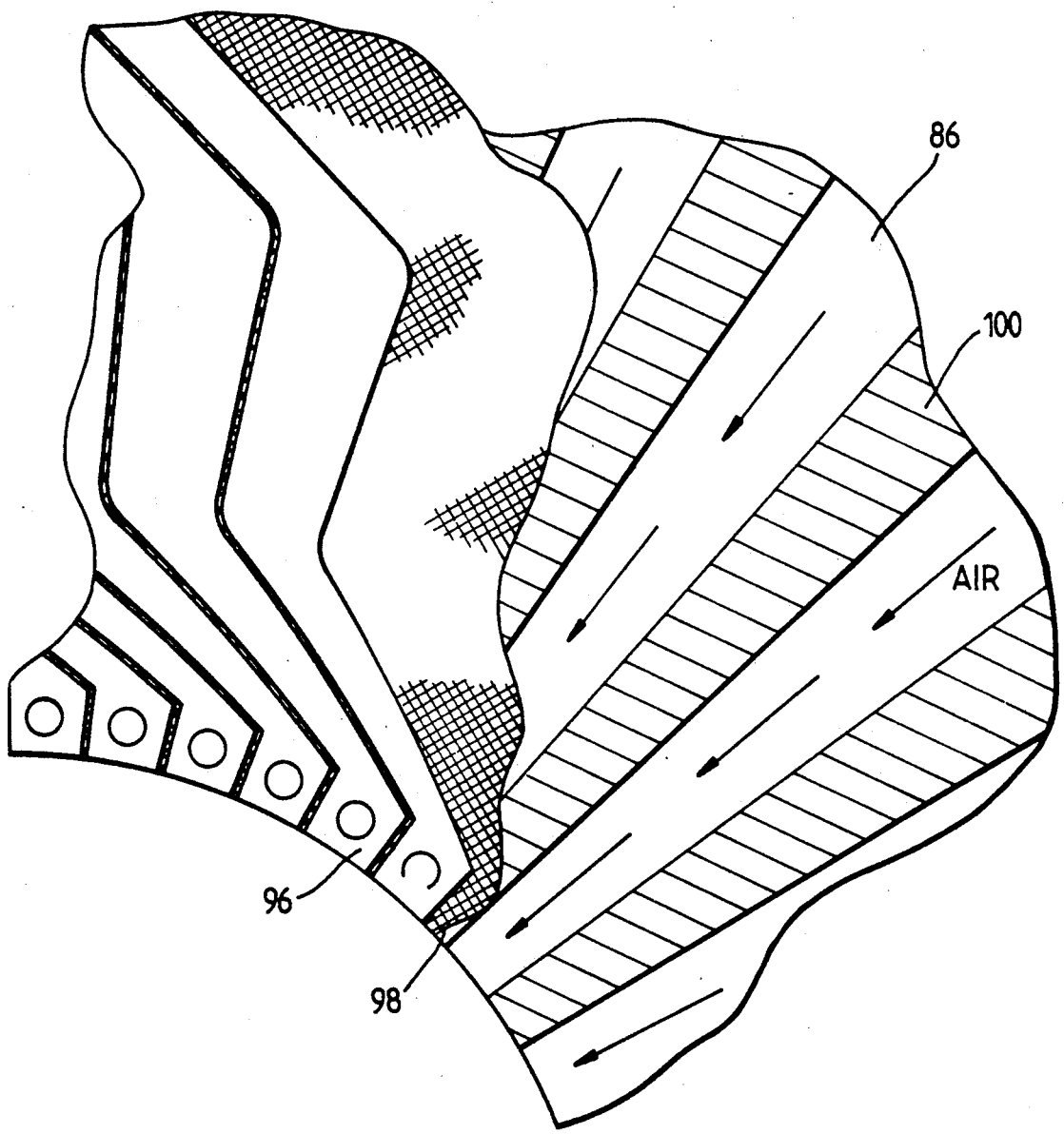

The invention and how it may be carried out in practice will now be described with reference, by way of example only, to the embodiment illustrated in the accompanying drawings, in which:

FIG. 1 shows a view of an axial section through an axial field disc rotor electrical generator, FIG. 2(a) and FIG. 2(b) shows a sectional view through a first design of rotor stage on line A—A in the generator of FIG. 1, the view of FIG. 2(a) being transverse to the axis of the rotor and FIG. 2(b) being a lateral view, FIG. 3 is a section through a second design of rotor, FIG. 4 is a schematic view of a wire wound stator showing one phase of a three phase winding, FIG. 5 shows a sectional view of a stator winding having internal cooling passages, and FIG. 6 is a partly sectioned fragmentary view of an etched winding stator having internal cooling passages.

Referring to FIG. 1 this shows an axial field alternator having permanent magnet disc rotors 2 shown in greater detail in FIG. 2(a), FIG. 2(b) FIG. 3 which are designed to spin at very high rotational speeds.

The disc rotors 2 are supported for rotation with respect to stators 4. As a minimum, and in dependance upon the electrical power output required, the alternator has at least one rotor and at least one stator. The illustrated arrangement as depicted has five rotors and interdigitated between these four stators. Each rotor 2 carries a plurality of permanent magnets 6 and at either end of the machine abutting the outermost end faces of the permanent magnets are keeper discs 8 formed of magnetically permeable material. The two keeper discs 6 provide closed flux paths between magnets in the end rotors. The keeper discs 8 are arranged to rotate in unison with the rotors 2 thereby maintaining a constant magnetic field and avoiding hysteresis effects and the eddy current losses associated with fixed means.

The rotor assembly is mounted on a driving shaft 10 which may be coupled to the output shaft of a prime mover (not shown). For example, shaft 10 may be directly coupled to the shaft of a gas turbine engine, the rotational speeds for which this alternator rotor are designed are therefore of the order of up to 100,000 rpm. The alternator could be designed as an integral part of a gas turbine engine, for example, the compressor. Optionally the alternator may be driven by a shaft carried by a free turbine stage which is in turn driven by a gas generator.

The rotor assembly is supported by bearings one of which is indicated generally at 12 within a housing a portion 14 of which is shown in the drawing. The remainder of the housing and a shaft bearing at the opposite side of the rotor assembly have been omitted for clarity. Because of the high rotational speeds involved the rotor assembly is preferably supported on air bearings, although the illustrated example has rolling element bearings which may be suitable as an alternative depending upon the speeds to be reached. Floating bush type bearings could also be suitable for some installations.

FIG. 2(a) shows an end view of a permanent magnet rotor and at (b) a diametric section through the rotor. Referring particularly to the view of FIG. 2 (a) the rotor 2 comprises a hub 16 formed from a single block of aluminium in the shape of an eight-pointed star. The eight limbs or ears 18 of the star form between them notches or pockets into which are received the eight permanent magnets of the rotor stage. Adjoining faces 20 and 22 of adjacent ears 18 are formed with an included angle which is substantially a right angle. The included corner so formed is radiused to avoid a sharp angle which could concentrate stress in that region.

The permanent magnets 6 in plan view are roughly triangular and each has a right angled corner which is radiused like the included angle in the hub. The dimensions of the magnets 6 correspond to the dimensions of the pockets in the hub so that each magnet may be received into a pocket. The height of each magnet is slightly greater than the radial depth of a pocket so that when all eight magnets are assembled onto a hub their outer peripheral faces 23 stand clear of the ends of the ears 18 of the hub. These peripheral faces 23 are curved in accordance with the circumference of a circle of the same diameter.

Engagement of the magnets 6 with the pockets formed between the ears 18 of the hub 16 is positively maintained by pre-stressed hoop means 24 encompassing the assembly. The inner diameter of the hoop means 24 is approximately the same as or slightly less the diameter of the circumference of the outer faces of the assembled magnets 6, according to whether the hoop means 24 is to be a push-fit or an interference fit.

The hoop means 24 preferably comprises a composite assembly consisting of an inner one-piece aluminium ring 26 and an outer carbon fibre resin-impregnated ring 28. The aluminium ring 26 in the final rotor assembly is subject to radial compression to maintain at all rotor speeds up to maximum a compressive load on the outer faces of the magnets 6 in opposition to the centrifugal forces imported by rotation. The hoop tension needed to generate the compressive forces which hold the magnets onto the hub is provided mainly by the carbon fibre ring. The aluminium ring 26 is also effective as a damping means to damp-out oscillations or resonances to which the magnets may be subject. Also the aluminium ring provides a soft bedding between the magnets and the carbon fibre ring, local yielding reduces stress concentrations caused by the corners of the magnets. The compressive forces maintain positive location of the magnets against the angled faces 20 and 22. To avoid adverse effects of stress concentration at the corners the faces 20 and 22 on the hub ears are preferably formed slightly convex so that the contact area is away from the corners of the magnets. Alternatively, the hub faces 20 and 22 may be formed flat with the faces of the magnets convex. A combination of the features could also be used if desired.

Referring now to FIG. 3 the hub 36 is formed from a single block of aluminium in the shape of an octagonal member of short axial length. Each of its eight outer faces 40, which receives a magnet segment 38, has a flat surface bounded on both edges adjacent the neighbouring sides by an axially extending locating rib 42. In the transverse plane, the magnet segments 38 each have a corresponding flat inner face, a curved outer face and radial sides. The dimensions of the inner face of a segment are equal to the dimensions of the flat faces 40 of the hub, while the radius of curvature of the outer face is such that when the segments are mounted on the hub the outer faces lie on the same surface of revolution. The raised ribs 42 locate the generally radial side faces of the magnet segments, and the narrow gap between adjacent segments is filled, e.g. with an epoxy filler, to prevent relative movement of the magnets.

The hub and magnets of the rotors of FIG. 2(a), FIG. 2(b) and FIG. 3 all have the same axial length and perpendicular end faces. To ensure that all stages have perfectly flat and perpendicular end faces they may be machined after assembly. Balancing is carried out by drilling into the aluminium ribs 42 or ears 16 as appropriate and filling with a denser material for example lead or steel.

The magnets 38 are mounted on each hub with their magnetic vectors in alternate directions and are held in position by means of circumferential hoops 26 and 28. Two such hoops are used in the examples described, one a non-magnetic hoop of aluminium and the other of carbon fibre. The inner one 26 of the two hoops is formed of aluminium to be a push-fit onto the stationary magnet/hub assembly at normal room temperatures. Around the outside of the aluminium hoop there is formed a second hoop of composite material.

Preferably the composite ring is made either of filement wound carbon fibre or pre-impregnated uni-directional carbon fibre sheet. Other composite materials such as KEVLAR, ceramic fibre etc may also be employed where the strength required is compatible with the material. If the ring is formed in situ and heat curable resin is used care must be taken during the curing process not to exceed the Curie temperature of the magnetic material. Preferably, however, the carbon fibre ring 28 is made beforehand as a push-fit over the aluminium ring 26. The hub, magnet and tension rings can thus be assembled easily. Finally each rotor stage is pre-stressed by forcedly expanding the hub so that the hoops 26 and 28 are placed in tension, thereby to exert a radially inward compressive force on the magnetic segments.

Hub expansion is maintained by pressing a slightly oversize boss or plug 48 into the central bore of the hub. The plug may be simply pressed into position using a straightforward clamping press. Alternatively, an oil injection method may be employed in which oil is used as both a lubricant during insertion and as an hydraulic pressure medium to force the plug into the hub. The plug in its preferred form has at one end an integral flange which constitutes the spacer 32.

The central bore in the hub can be formed in a slight taper and a correspondingly tapered elongate plug pressed into the bore until the required expansion is achieved. The surplus length of plug is then machined from both sides to provide flush rotor faces. A straight sided plug can also be fitted, into a straight sided bore. In the corresponding method of fitting a succession of progressively larger tapered mandrills is pressed into the hub again until the required expansion is achieved. A plug of the appropriate size and already cut to the appropriate length is then pressed into the bore following the last mandrill. This method is more economical of material and the mandrills can be used over and over again.

The pre-stressed hoop means may be tensioned and fitted to the hub and magnet rotor assembly by hydraulically expanding the carbon fibre reinforced hoop. The composite hoop assembly is made up separately with internal dimensions which constitute an interference fit on the hub assembly. To enable the hoop means to be fitted to the hub assembly the hoop is positioned in a jig together with the hub assembly including the magnets. Hydraulic pressure is then applied to expand the hoop, as the hoop means expands the whole hub assembly can be slipped into the carbon fibre hoop.

The axial bore of the rotor is formed on a true centre after assembly and the whole is then preferably dynamically balanced. The several rotary stages are then assembled together on a common shaft with the flush end face of the hub and plug of one stage abutting the opposite face of the flanged portion of the adjacent rotor stage. Means may be provided at either end of the rotor assembly to maintain axial compression. Individual rotor stages are keyed one to another by drive pins 58 inserted through axially extending holes formed through the flanges of the expansion plugs and through the hubs. The pins 58 are restrained from axial movement by abutment with flanged portions 60 and 62 of end caps 8. Alternatively, the shaft 10 and the rotors 2 may be engaged by means of splines or other suitable coupling means.

In the rotor assembly as described and illustrated the rotors are spaced apart by a narrow gap and generator windings 64–70 are interdigitated with the rotor stages. The windings can be formed of fine gauge wire wound onto a former in single phase or multi-phase arrangement, generally a three phase output is required from machines of this kind. In the example being described the winding loops instead of comprising the familiar many turns of a single strand of wire are formed of a few turns of bundles of wire consisting of many strands of fine gauge wire. The fine gauge minimises eddy current losses in the wire itself. Also the bundles are twisted for just a few twists in each radial limb of a winding to obviate the formation of eddy current loops within the wire bundles.

These stationary generator windings are generally annular or toroidal in shape and encircle the spacer members of the rotor stages. In the form illustrated the windings are relatively narrow, that is they are thin in the axial direction, basically to fit into the relatively narrow gaps between the rotor stages. The spacing between the rotor stages is dictated principally by the requirements for containing the axial magnetic field created by the magnets. If the gap is too large the output of the generator will fall as the flux density of the inter-stage field falls in the region swept by the stator windings.

Similar considerations relating to the behaviour of the magnetic field apply to the alternative arrangement in which the rotor stages abut one another and the generator windings are positioned at either end of the rotor assembly. The windings are again wound on annular formers and are located as close as possible to the exposed end faces of the rotor. As the lines of magnetic flux emerge from these end faces the field has a strongly predominant axial component and providing these end located windings are kept fairly thin, in the axial direction, and close to the end faces of the rotor output losses are kept low.

The multi-filament stator windings are supported at their circumferences by a plurality of supporting studs, such as at 74, spaced apart circumferentially around the axis of the alternator to which the winding formers are attached. In the particular example illustrated, the studs 74 are cantilevered from the end plate 54. As shown in the drawing the stud mounting flanges 76 of the stator windings are suspended by spacer sleeves 78 to ensure that the correct spacing between stators is maintained at all times.

FIG. 4 contains a substantially diagrammatic illustration of a three-phase multi-stranded wire-wound stator, although for clarity only one phase winding is shown in position. The or each winding comprises a length of multi-stranded copper wire each strand of which is separately insulated. The wire is wound, either stitched on a former or preferably wound around pegs arranged in concentric circles as in the drawing. The winding layout is designed to operate in conjunction with the rotor design of FIG. 2(a) and FIG. 2(b).

The winding pegs are disposed in three concentric circles 80, 82 and 84. The first circle 80 of pegs at the smallest radius defines the inner periphery of the stator winding. This radius is slightly less than radius of the innermost tips of the magnets 6 of FIG. 2(a) and FIG. 2(b).

The radius of the second circle 82 of pegs at the intermediate radius is substantially equal to the radius of the circumference of the magnet assembly, and the third circle 84 has a slightly greater radius.

Each winding comprises a double layer wave winding each arm of which contains single dog-leg created by the pegs in the two outer circles 82 and 84 selected to support the wire. The circumferential width of each loop of the winding is sufficient to embrace a complete magnet end face, that is the instantaneous peak flux cut by each of the winding loops is as nearly as possible equal to the total field of each magnet in order to gain maximum efficiency. The shape of the magnets and the shape of the winding loops are therefore chosen with this object in mind.

The start of one winding phase is indicated at X and proceeds in a first layer in a clockwise direction for eight loops. The winding direction is then reversed of a further eight loops in a second layer to terminate at point Y. These two layers are displaced circumferentially by the width of one peg spacing. The peg spacing is determined by the total number of phase windings, in this case there are three phases so, in total, there are six winding layers.

The described stator has 2 turns per pole, however, the windings may comprise 1 turn per pole, 3 turns per pole, 4 turns per pole etc depending on the voltage required. The greater the number of turns per pole used the greater is the voltage produced, but the lower is the current.

The stator winding may be totally encapsulated in an epoxy or curable resin material to provide inherent rigidity. Alternatively an epoxy and ceramic mixture may be used to produce a stiffer and more thermally stable material. Means by which the stator can be suspended can be incorporated at this stage. Where it is desired to provide internal stator cooling the superimposed winding layer may be only partially encapsulated to provide in the completed stator a substantially open weave structure through which cooling air may be allowed to diffuse.

The alternator is built-up in stages from one end by stacking the rotor and stator stages one on top of another so that annular rotor and stator stages are mounted alternately. The rotors are mounted with the magnet segments 38 in register and with opposite poles facing one another in order to provide maximum field strength.

Forced induction of cooling air may be provided as necessary, for example, by means of air ducted from a bleed on the compressor section of a gas turbine engine. Cooling fluid, that is an air supply, can be provided to the stator windings illustrated in FIGS. 5 and 6 through an air supply connection 85 to a hollow cavity through the centres of the hubs. The hubs are pierced by radial cooling passages 82 which allow air to be ejected around the periphery of the stator windings.

In one embodiment of the basic design the formers which carry the stator windings are formed with internal cooling passages 86 supplied with air from an external supply, see FIG. 5. In one arrangement (not shown) a stator comprises a single layer of windings on an annular former into the body of which are built a plurality of generally radial internal cooling passages 86. In a former constructed using for example a reinforced plastic structure the cooling passages may comprise hollow straws suspended in the reinforcing structure.

In all the arrangements described above it was assumed that each of the magnets 6 was a discrete magnet. However, in their place an annular magnet may be substituted. Comprising a relatively thick walled cylinder of magnetisable material the magnets are formed by selectively magnetising axial regions of the cylindrical wall. As before, the magnets thus formed alternate in polarity so that between each magnetised region is an unmagnetised region equivalent to the arms of FIG. 2(a), FIG. 2(b) and FIG. 3.

This annular magnet is preferably magnetised before final assembly. However, because it is composed of magnetic material it is fairly brittle and cannot be stressed safely although it is stronger in compression. Consequently the inner hub cannot be forcedly expanded in order to place the outer hoops 26 and 28 in tension. Instead the outer hoops themselves must be expanded and then fitted onto the annular magnet. The diameter of the unstressed hoops 26 and 28 must therefore be less than the diameter onto which they are located in order to produce the required residual tension.

The magnetically permeable keeper discs 8 are preferably formed with a double flange arrangement in which the inner flange 54 abuts the end faces of the magnets 6 in the endmost rotors 2. The second or outer flange 56 serves a mechanical function at high rotational speeds by generating an axial force which acts on the inner flange 54 in an inward direction tending to counter an outward axial force found to occur in single flange keeper discs. The outward axial force tends to bend a single a flange away from the face of the magnets thereby introducing an unwanted airgap in the magnetic circuit causing a loss of efficiency. The opposing force introduced by the second flange maintains contact between the inner face of the inner flange 54 and the outermost faces of the end rotor magnets.

We claim:

1. An axial field electrical generator capable of operating at very high rotational speeds comprising: at least one permanent magnet disc rotor having a plurality of permanent magnet segments equiangularly spaced apart around a hub, said hub containing notches or pockets to engage said permanent magnets and with which engagement is maintained during operation by means of pre-stressed hoop means encompassing the hub and magnets, said pre-stressed hoop means being formed initially as a push fit and stressed during assembly with the hub and magnets by expansion of the hub by forcedly fitting into a central bore of the hub a relatively tapered boss; and a stator winding spaced a short axial distance from a face of the disc rotor.

2. A generator according to claim 1, wherein the shape of the notch or pocket formed between adjacent radiating portions of the hub conforms substantially to the shape of the permanent magnets.

3. A generator according to claim 2, wherein the included angle between adjacent radiating portions of the hub is substantially a right angle.

4. A generator according to claim 1, wherein the hub is formed of a metal being either aluminium or titanium.

5. A generator according to claim 1, wherein the pre-stressed hoop means comprises a composite hook assembly including an inner metal ring.

6. A generator according to claim 5, wherein the metal ring of the composite hoop assembly is formed of aluminium.

7. A generator according to claim 5, wherein the composite hoop assembly includes an outer ring made of composite material.

8. A generator according to claim 7, wherein the composite material ring is filament wound carbon fiber or is fabricated using resin impregnated carbon fiber sheet.

9. A generator according to claim 1, wherein the boss is forcedly fitted into the hub by a hydraulic pressure method.

10. A generator according to claim 1, wherein the hoop means is formed as an interference fit to the hub and magnets and assembly is achieved by differential expansion of the hub and the hoop means.

11. A generator according to claim 1, comprising a plurality of rotor stages rotatable in unison and the permanent magnets are arranged such that each pole has as its nearest neighbor an opposite magnetic pole.

12. A generator according to claim 11, wherein a plurality of stator winding stages are interdigitated with the rotor stages.

13. A generator according to claim 1, wherein each stator winding stage comprises an annular self-supporting wire-winding suspended by means attached toward its periphery.

14. A generator according to claim 13, wherein the stator winding comprises a multi-stranded coreless winding at least partially encapsulated to form a rigid self-supporting structure.

15. A generator according to claim 14, wherein a substantial portion of the winding structure is unencapsulated so as to constitute an open porous structure through which cooling air may circulate.

16. A generator according to claim 13, wherein the stator winding comprises an etched or printed circuit formation carried on a rigid insulating substrate.

17. A generator according to claim 16, wherein the stator winding substrate is formed with internal passages for conducting cooling air.

18. A generator according to claim 17, wherein the cooling air passages communicate with a source of cooling air.

19. A generator according to claim 1, further comprising magnetically permeable keeper discs at either axial end of the machine which rotate in unison with the rotor stages.

* * * * *